(12) United States Patent
Matsuzaki

(10) Patent No.: US 8,477,369 B2
(45) Date of Patent: Jul. 2, 2013

(54) IMAGE PROCESSING APPARATUS AND ITS METHOD, AND COMPUTER-READABLE STORAGE MEDIUM

(75) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 12/625,042

(22) Filed: Nov. 24, 2009

(65) Prior Publication Data

US 2010/0134850 A1 Jun. 3, 2010

(30) Foreign Application Priority Data

Dec. 2, 2008 (JP) ................................. 2008-307588

(51) Int. Cl.
*H04N 1/40* (2006.01)

(52) U.S. Cl.
USPC .............................. 358/1.9; 358/504; 358/406

(58) Field of Classification Search
USPC ................... 358/1.2, 1.9, 2.1, 3.12, 528, 451, 358/3.07, 400, 500, 406, 504
See application file for complete search history.

(56) References Cited

U.S. PATENT DOCUMENTS

| | | | | |
|---|---|---|---|---|
| 6,175,660 B1 * | 1/2001 | Nabeshima et al. | ........... | 382/274 |
| 6,333,997 B1 * | 12/2001 | Hashiya et al. | ............... | 382/201 |
| 6,958,827 B1 * | 10/2005 | Kaneko et al. | ................. | 358/1.2 |

FOREIGN PATENT DOCUMENTS

| | | |
|---|---|---|
| JP | 09307750 A | 11/1997 |
| JP | 2000092286 A | 3/2000 |
| JP | 2000-349966 A | 12/2000 |
| JP | 2003101782 A | 4/2003 |
| JP | 2005123681 A | 5/2005 |
| JP | 2006121622 A | 5/2006 |
| JP | 2006339915 A | 12/2006 |
| JP | 2008110568 A | 5/2008 |
| JP | 2008172522 A | 7/2008 |

\* cited by examiner

*Primary Examiner* — Thomas D Lee
*Assistant Examiner* — Stephen M Brinich
(74) *Attorney, Agent, or Firm* — Canon U.S.A., Inc. IP Division

(57) ABSTRACT

An image processing apparatus which inputs data obtained by reading a chart of highlights formed by an image forming apparatus and generates a correction condition of an image reading unit based on the data. The image processing apparatus includes a first image reading unit configured to read the chart of highlights formed by the image forming apparatus, a second image reading unit configured to read the chart of highlights, a calculation unit configured to calculate a difference between an image signal read by the first image reading unit and an image signal read by the second image reading unit, and a generation unit configured to generate a correction condition for correcting reading resolving power of the first image reading unit or reading resolving power of the second image reading unit corresponding to the difference.

13 Claims, 17 Drawing Sheets

FIG.11
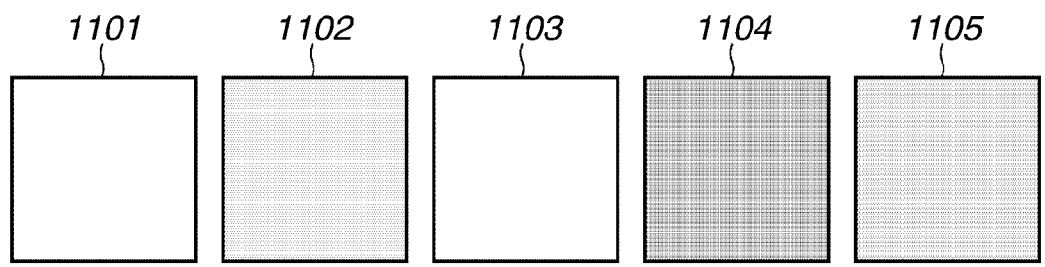
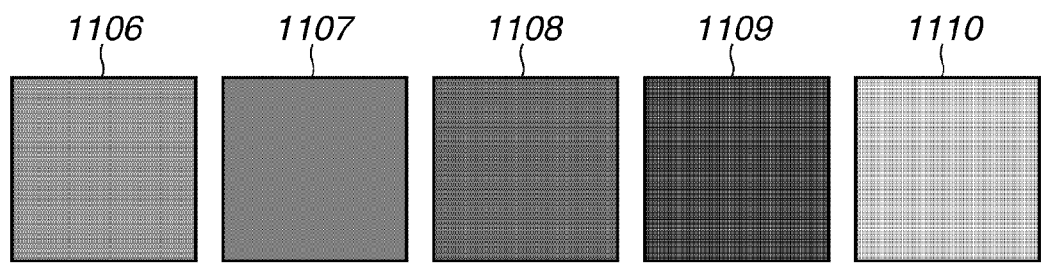

IMAGE PROCESSING APPARATUS AND ITS METHOD, AND COMPUTER-READABLE STORAGE MEDIUM

BACKGROUND OF THE INVENTION

1. Field of the Invention

The present invention relates to an image processing apparatus and its method, a computer program and a storage medium. For example, the present invention relates to image processing of a copy produced by using a scanner.

2. Description of the Related Art

An apparatus which realizes by itself a plurality of functions as a copy machine, a printer, and a facsimile machine (FAX) is referred to as a multifunction peripheral (MFP). A scanner which is mounted on the MFP or the like includes an optical system for introducing light reflected from a document positioning plate by scanning to a solid-state image sensor such as a charge coupled device (CCD).

The optical system has fixed resolving power and can convert a contrast into a numerical value by calculation. In a scanner which has high resolving power, even a small character can distinctly be scanned. Whereas, in a scanner which has low resolving power, even a large character is indistinctly scanned.

In a conventional scanner which is mounted on an MFP or the like, target resolving power is determined using a contrast converted into a numerical value and adjusts the scanner so as to fit thereto. However, resolving power may vary under an influence of a user's usage, change with the passage of time, or the like. An amount of the variation is changed depending on an environment such as temperature and humidity, a number of activating times, and the like. Thus, in each scanner, the amount of the variation is different.

Thus, for example, in an apparatus which mounts a scanner unit configured to read a front side of a document and a scanner unit configured to read a back side thereof, resolving power reading the front side and resolving power reading the back side may be different. When resolving power is different, a problem arises in which a scanning result of characters and halftone dot portions is different between a scanner for reading the front side and a scanner for reading the back side even if the same document is read.

Further, even if the same scanners are used, resolving power may be different in a plane due to adjustment of the scanner. Accordingly, in a conventional technique, a chart which has fixed resolving power as indicated in a chart 101 of FIG. 1 is scanned to detect abnormality of resolving power of a scanner. Then, a scanning result is compared with a specified value to correct the resolving power of the scanner using the detected value (e.g., refer to Japanese Patent Application Laid-Open No. 2000-349966).

However, in Japanese Patent Application Laid-Open No. 2000-349966, to detect resolving power of a scanner, a chart which has specified resolution must be prepared. In order to generate a chart which has specified resolution, a high-performance printing machine is required. Further, there has been a problem that the chart itself is expensive. Furthermore, a user who uses a scanner needs to store the chart under a strictly controlled condition to prevent folding or soiling of the chart.

Further, a phenomenon occurs in which appearance of a highlight portion of a halftone dot document is different depending on resolving power of a scanner for a reason described below. The highlight portion refers to a light color data part. However, when a contrast converted into a numerical value is calculated using the chart 101 to execute processing for adjusting the resolving power, it is difficult to correct the resolving power when the contrast value and the actual appearance are not correlated. Particularly, if a degree of accuracy of the chart is low such that a line width of a line printed on the chart narrows, it is highly likely that correlation between the contrast value and the actual appearance is not established. As described above, when correction is executed using resolving power converted into a numerical value, there has been a problem that a result of the resolving power correction is different depending on accuracy of a chart.

SUMMARY OF THE INVENTION

The present invention is directed to highly accurately correcting a difference in resolving power of an image read by a plurality of image reading units without depending on accuracy of a chart.

According to an aspect of the present invention, an image processing apparatus which inputs data obtained by reading a chart of highlights formed by an image forming apparatus and generates a correction condition of an image reading unit based on the data. The image processing apparatus includes a first image reading unit configured to read the chart of highlights formed by the image forming apparatus, a second image reading unit configured to read the chart of highlights, a calculation unit configured to calculate a difference between an image signal read by the first image reading unit and an image signal read by the second image reading unit, and a generation unit configured to generate a correction condition for correcting reading resolving power of the first image reading unit or reading resolving power of the second image reading unit corresponding to the difference.

Further features and aspects of the present invention will become apparent from the following detailed description of exemplary embodiments with reference to the attached drawings.

According to the present invention, by correcting reading resolving power of a plurality of image reading units using a chart of highlights in which differences among the resolving power thereof are reflected, a difference in resolving power of an image read by the plurality of image reading units can be highly accurately corrected.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates image data including high-density data for calculating resolving power adjustment information according to a third exemplary embodiment.

DESCRIPTION OF THE EMBODIMENTS

Various exemplary embodiments, features, and aspects of the invention will be described in detail below with reference to the drawings.

In a first exemplary embodiment, a method will be described in which a plurality of scanners reads a chart generated using highlight image data and calculates a coefficient for adjusting resolving power.

Figure 1:
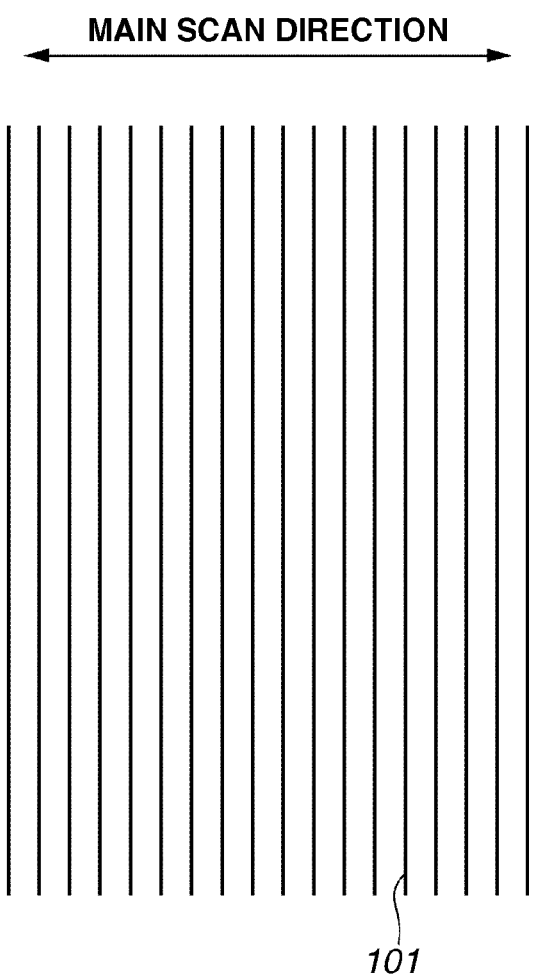
FIG. 1 illustrates an example of a conventional resolution correcting chart.
Figure 2:
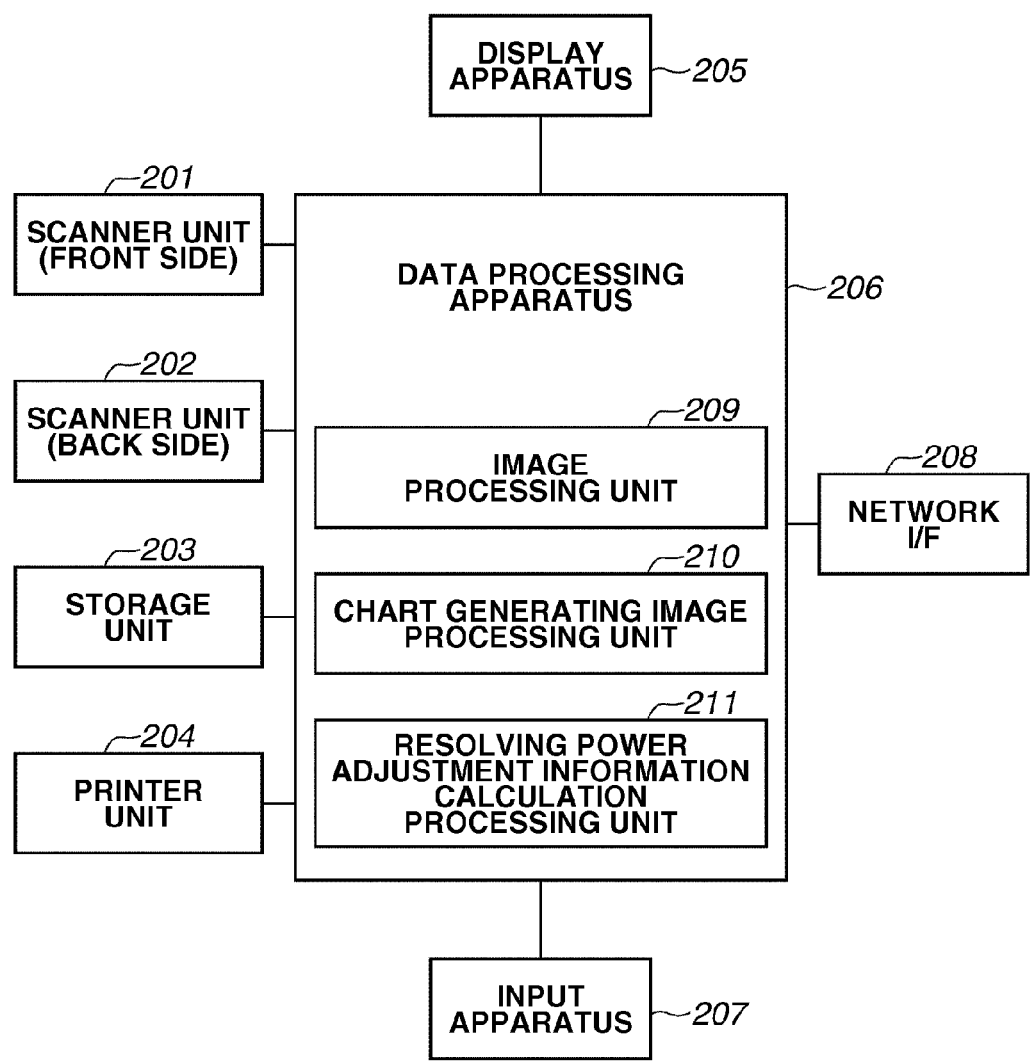
FIG. 2 illustrates a configuration of an MFP according to a first exemplary embodiment.

FIG. 2 illustrates an MFP. A scanner unit (front side) 201 is a scanner including an auto document feeder. The scanner unit (front side) 201 irradiates a bundle of document image or one document image with light from a light source (not shown), forms a reflected document image on a solid-state image sensor such as a CCD sensor by a lens, and obtains a rasterized image reading signal from the solid-state image sensor as image data. The scanner unit (front side) 201 reads a document placed on a document positioning plate or a front side of the document when the auto document feeder is operated.

A scanner unit (back side) 202 is a scanner installed in the auto document feeder and reads a back side of a document when the auto document feeder is operated. In the present exemplary embodiment, a target to be read (the front side and the back side of the document) is only different. The configuration of the scanner unit (front side) 201 and the scanner unit (back side) 202 is similar. However, a different configuration may be employed.

A data processing apparatus 206 processes various kinds of data. Particularly, an image processing unit 209 processes image data which is obtained from the above-described scanner and executes almost all processing in the present exemplary embodiment.

Figure 3:
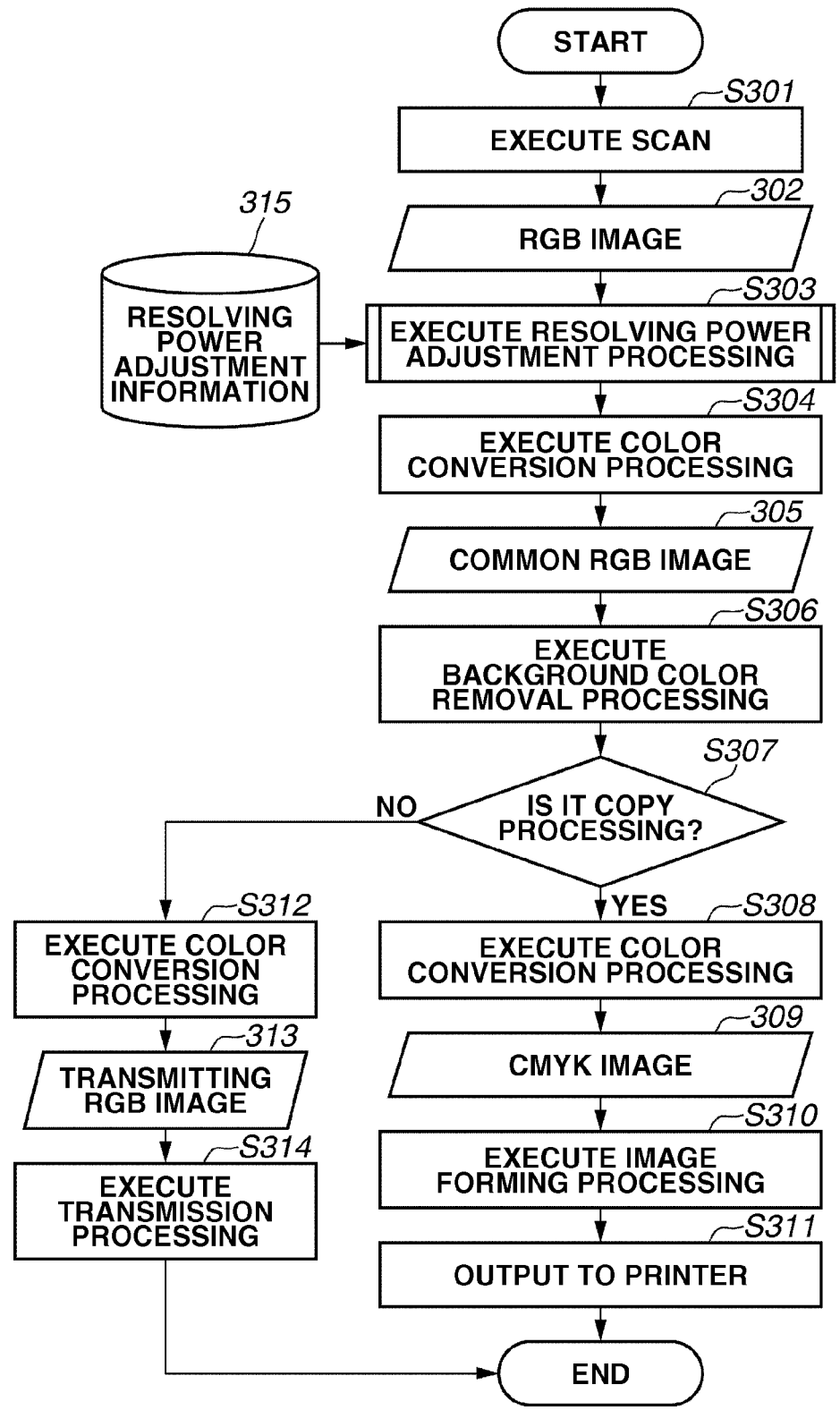
FIG. 3 is a flowchart illustrating a processing flow of an image processing unit in the MFP according to the first exemplary embodiment.

A flow of image processing which is executed by the image processing unit 209 is illustrated in FIG. 3. All of the following processing is executed by the image processing unit 209.

First, in step S301, the image processing unit 209 scans a document using the scanner unit (front side) 201 or the scanner unit (back side) 202 to obtain a red-green-blue (RGB) image 302.

Next, in step S303, the image processing unit 209 executes resolving power adjustment processing. In the resolving power adjustment processing, resolving power of the RGB image 302 is adjusted. In the present exemplary embodiment, edge enhancement processing or smoothing processing by filtering processing is used. Resolving power is increased by the edge enhancement processing and decreased by the smoothing processing.

When processing is executed in step S303, the image processing unit 209 refers to resolving power adjustment information 315. The resolving power adjustment information 315 is information calculated by the processing in the present exemplary embodiment. The details of which will be described below.

After the resolving power of the RGB image 302 is changed in step S303, in step S304, the image processing unit 209 executes color conversion processing and obtains a common RGB image 305. Then, in step S306, the image processing unit 209 executes background color removal processing for removing the background color of the document.

In step S307, the image processing unit 209 determines whether processing to be executed is copy processing. When it is copy processing (YES in step S308), the processing proceeds to step S308. In step S308, the image processing unit 209 executes color conversion processing and obtains a cyan-magenta-yellow-black (CMYK) image 309. Then, in step S310, the image processing unit 209 executes image forming processing. In step S311, the image processing unit 209 outputs the formed image to a printer unit 204.

If it is determined that it is not copy processing (NO in step S307), then in step S312, the image processing unit 209 executes color conversion processing different from step S308 and obtains a transmitting RGB image 313. Then, in step S314, the image data is transmitted to another device connected via a network interface (I/F) 208.

A chart generating image processing unit 210 in the data processing apparatus 206 executes processing for generating a chart to calculate the resolving power adjustment information 315. The details will be described below.

A resolving power adjustment information calculation processing unit 211 in the data processing apparatus 206 is a processing unit for calculating the resolving power adjustment information 315. The details will be described below.

The printer unit 204 is a printer for outputting an image. When a copy function of the MFP is executed, an image signal obtained by the scanner unit (front side) 201 or the scanner unit (back side) 202 which serve as an image reading unit is converted into a recording signal by the image processing unit 209 in the data processing apparatus 206. The recording signal is sequentially outputted to the printer unit 204 in order to form an image on paper. The printer unit 204 generally includes an output unit configured to output data on paper using color materials of cyan (C), magenta (M), yellow (Y), and black (K). The printer unit 204 forms an image based on the data processed by the data processing apparatus and outputs it.

Instructions from a user to the MFP are input from an input apparatus 207 which is a key operation unit installed in the MFP. Above described series of operation are controlled by a control unit (not shown) in the data processing apparatus 206.

On the other hand, a state of operation inputs and an image during processing are displayed by a display apparatus 205. A storage unit 203 is a read only memory (ROM) or a random access memory (RAM) which can store an image or the like read by the scanner unit (front side) 201 or the scanner unit (back side) 202.

The network I/F 208 is an interface for connecting the apparatus and units to a network. By using the network I/F 208, the image processing unit 209 in the data processing apparatus 206 can receive an image from a personal computer (PC) or the like, process the received image, and cause the printer unit 204 to print the image. Further, data which is read by the scanner unit (front side) 201 or the scanner unit (back side) 202 and processed by the image processing unit 209 in the data processing apparatus 206 can be transmitted to a PC or other MFPs via the network I/F 208.

Figure 4:
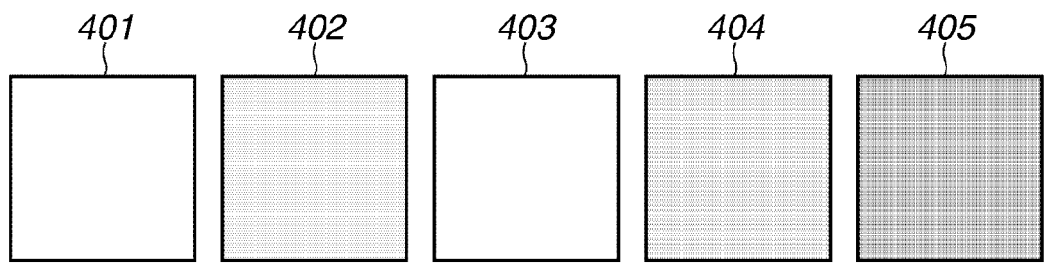
FIG. 4 illustrates image data for calculating resolving power adjustment information according to the first exemplary embodiment.

Next, FIG. 4 will be described. FIG. 4 illustrates pieces of image data for calculating resolving power adjustment information which is used in the present exemplary embodiment. All pieces of the image data include bright highlight colors. An example in FIG. 4 includes rectangular pieces of highlight cyan 401, highlight magenta 402, highlight yellow 403, highlight black 404, and mixed color gray 405 which includes highlight cyan, magenta, and yellow. If it is highlight data, data in FIG. 4 may be any color such as red, green, or blue. Further, the shape of data may not be a rectangle.

The highlight data is light color data in which a halftone dot structure of the document can be recognized when it is magnified by a microscope or the like. A document in which the halftone dot structure can be recognized is affected by a modulation transfer function (MTF). More specifically, the highlight data is data which includes an area ratio of a halftone dot (area of halftone dot per unit area) is about 50% or smaller. The area ratio of a halftone dot which defines the highlight data is changed according to resolution of a scanner, lines per inch of a document and a dot gain.

A reason for using the highlight data will be described. When a document is formed by dark color data, even if it is printed by a halftone dot, a dot of the halftone dot does not appear. Thus, if it is read by scanners which have different resolving power, appearance of the read images may not be different.

On the other hand, when data approach a highlight color, particularly in a document printed by low lines per inch, a dot of a halftone dot appears.

Figure 16:
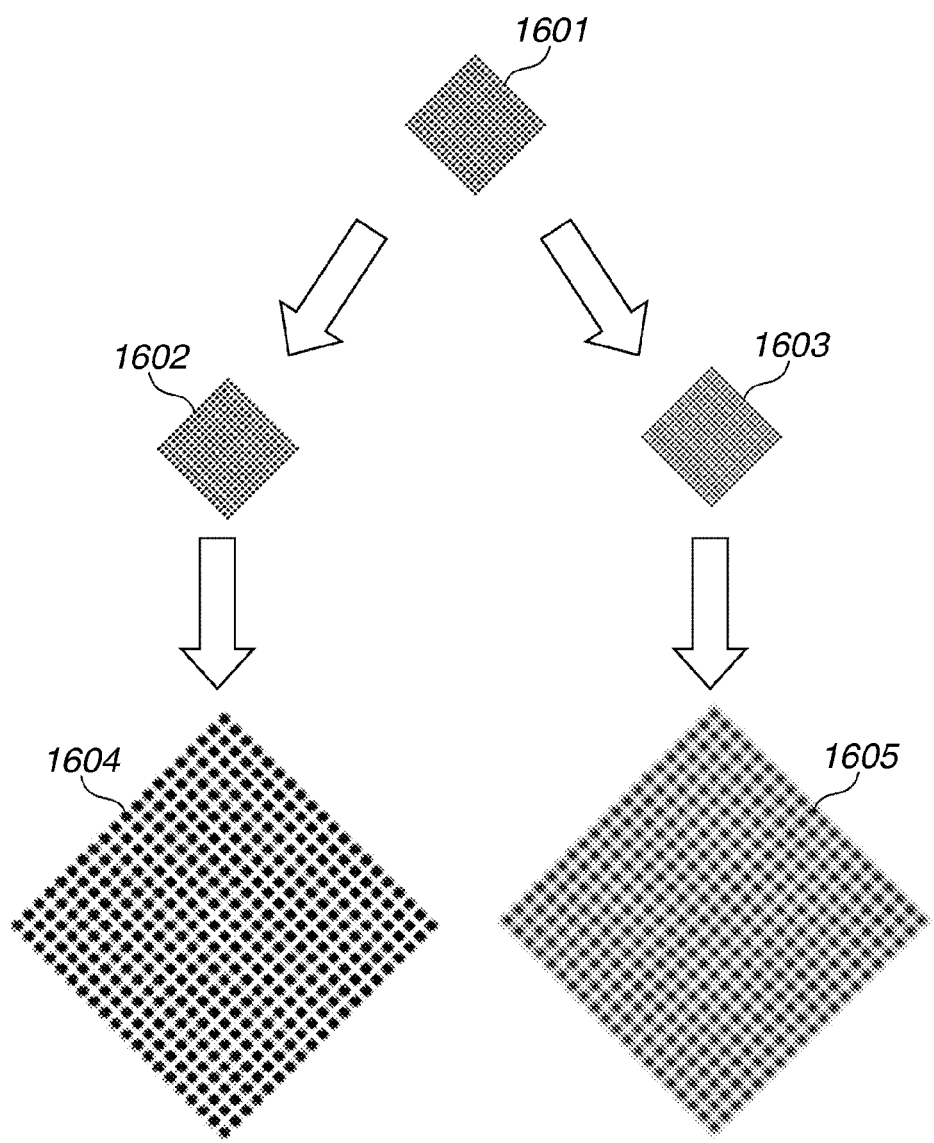
FIG. 16 illustrates an example of a reason for using highlight data according to the first exemplary embodiment.

A document 1601 shown in FIG. 16 is an example of light color data that is printed by a halftone dot. A scan image 1602 is an example when the document 1601 is scanned by a scanner with high resolving power. A scan image 1603 is an example when the document 1601 is scanned by a scanner with low resolving power. If scanners have the same color separation performance but different resolving power, appearance between the scan image 1602 and the scan image 1603 may be different.

A scan image 1604 is provided by magnifying the scan image 1602 and a scan image 1605 is provided by magnifying the scan image 1603. In the scan image 1604 scanned by the scanner with high resolving power, the halftone dot structure of the document 1601 is accurately reproduced. In contrast to this, in the scan image 1605 scanned by the scanner with low resolving power, the halftone dot structure of the document 1601 becomes indistinct. As described above, when resolving power is different, particularly in a document with a halftone dot of highlights in which a dot of the halftone dot appears, a phenomenon may occur in which scanned images differ in appearance. When image processing is performed on the above-described scan images, the difference is emphasized and the appearance of images may further differ from each other.

In the present exemplary embodiment, below described processing will be executed by focusing on this phenomenon.

Figure 5:
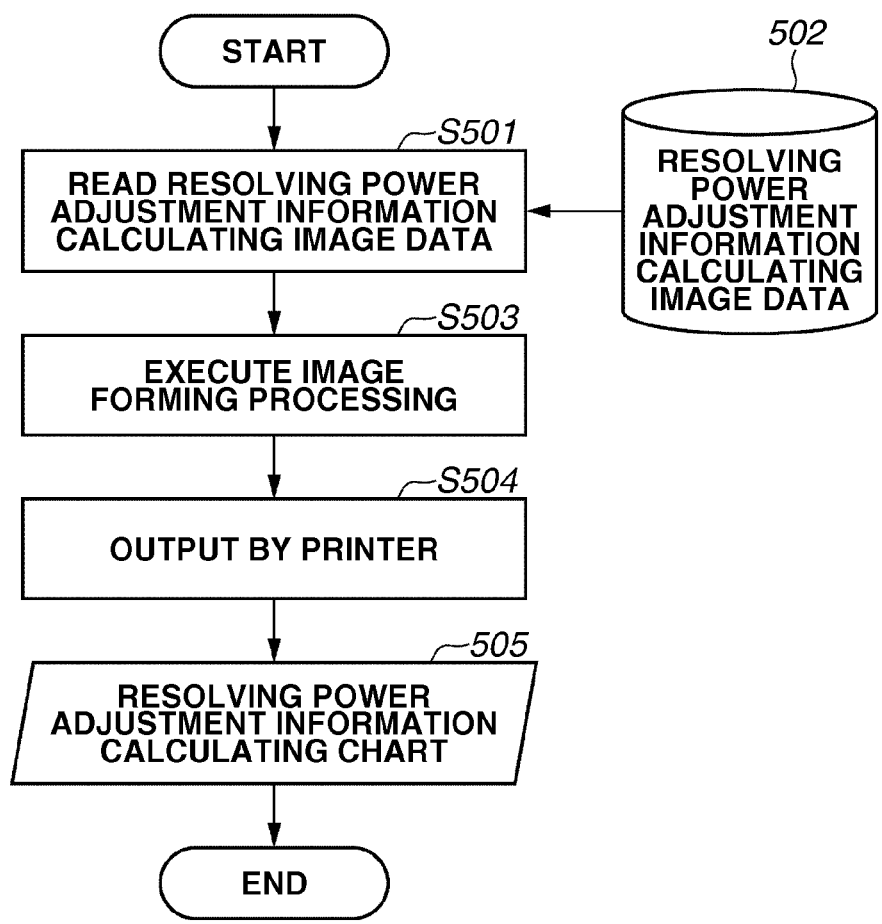
FIG. 5 is a flowchart illustrating a processing flow for generating a chart which is used in the first exemplary embodiment.

FIG. 5 is a flowchart illustrating a processing flow for generating a chart for calculating resolving power adjustment information. All processing shown in FIG. 5 is executed by the chart generating image processing unit 210.

First, in step S501, the chart generating image processing unit 210 reads resolving power adjustment information calculating image data 502. The resolving power adjustment information calculating image data 502 includes highlights as shown in FIG. 4.

Then, in step S503, the chart generating image processing unit 210 executes image forming processing. The image forming processing is desirable to be a screen pattern which has low lines per inch, but any image forming processing may be employed.

Next, in step S504, the chart generating image processing unit 210 outputs data which is subjected to the image forming processing by a printer and obtains a resolving power adjustment information calculating chart 505 which is a chart of highlights.

Next, processing for calculating a resolving power adjustment method will be described using FIGS. 6 and 7. The following processing is executed by the image processing unit 209 and the resolving power adjustment information calculation processing unit 211.

Figure 6:
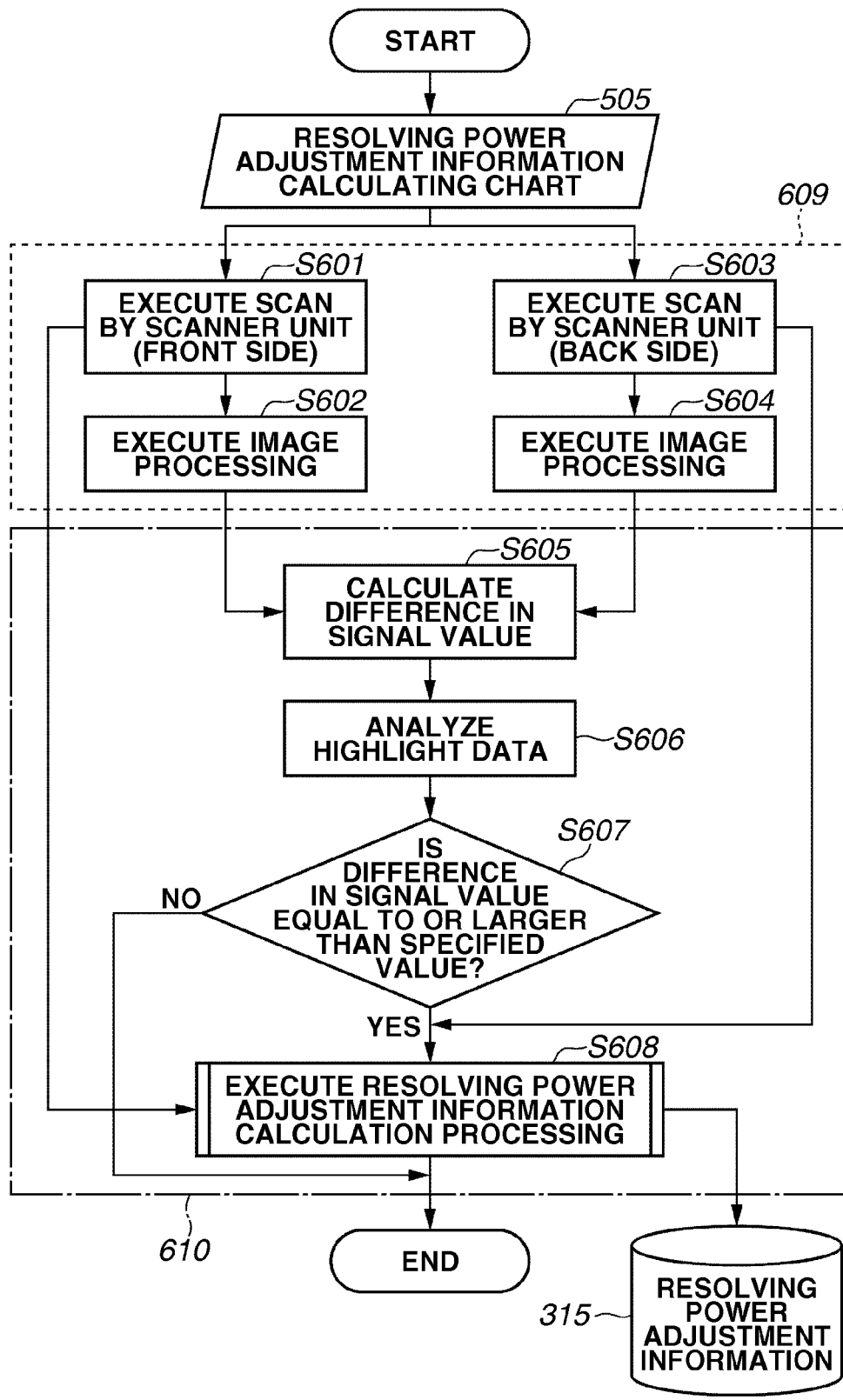
FIG. 6 is a flowchart illustrating a processing flow for calculating resolving power adjustment information according to the first exemplary embodiment.

Processing 609 in steps S601 to S604 shown in FIG. 6 is executed by the image processing unit 209. Further, processing 610 insteps S605 to S608 shown in FIG. 6 is executed by the resolving power adjustment information calculation processing unit 211.

Each step in FIG. 6 will be described. In step S601, the image processing unit 209 scans the resolving power adjustment information calculating chart 505 (chart of highlights) by the scanner unit (front side) 201 (first image reading unit), (first image reading processing).

Then, in step S602, the image processing unit 209 executes image processing. The image processing executed in step S602 may be all or a part of processing in steps S301 to S314 which is executed by the image processing unit 209.

More specifically, when a difference in signal values of the RGB image 302 is calculated in step S605, the image processing unit 209 does not execute the image processing in step S602. Further, when a difference in signal values of the common RGB image 305 is calculated in step S605, in step S602, the image processing unit 209 executes color conversion processing in step S304.

Further, when a difference in signal values of the CMYK image 309 is calculated in step S605, in step S602, the image processing unit 209 executes processing in steps S304, S306, and S308. In the present exemplary embodiment, processing until step S308 for calculating the CMYK image 309 in a case of copy processing is executed.

On the other hand, in step S603, the image processing unit 209 scans the resolving power adjustment information calculating chart 505 (chart of highlights) by the scanner unit (back side) 202 (second image reading unit), (second image reading processing). Then, in step S604, the image processing unit 209 executes image processing similar to that in step S602.

Next, in step S605, the resolving power adjustment information calculation processing unit 211 calculates a difference in image signals from data after the image processing scanned by the scanner unit (front side) 201 and data after the image processing scanned by the scanner unit (back side) 202. As the difference in signal values, an average value of a signal value of each patch in the resolving power adjustment information calculating chart 505 is used.

A difference between an average value of a signal value of the rectangle 401 read by the scanner unit (front side) 201 and an average value of a signal value of the rectangle 401 read by the scanner unit (back side) 202 is calculated. Similarly, differences in signal values are calculated to rectangles 402, 403, 404 and 405 respectively. An average value of signal values of the rectangle is used. However, any value, for example, a dispersion value of a signal value in a rectangle may be employed.

Next, in step S606, the resolving power adjustment information calculation processing unit 211 analyzes highlight data using the calculated difference in the signal values. When the difference in signal values is equal to or smaller than a predetermined specified value, it is assumed that there is no difference in resolving power. Then, the processing ends.

When the difference in signal values is equal to or larger than the specified value, in step S608, the resolving power adjustment information calculation processing unit 211 executes resolving power adjustment information calculation processing to generate the resolving power adjustment information 315 (correction condition) for correcting resolving power of image signals read by the scanner unit (front side) 201 and the scanner unit (back side) 202. In step S608, the resolving power adjustment information calculation processing unit 211 uses a result of scan by the scanner unit (front side) 201 in step S601 and a result of scan by the scanner unit (back side) 202 in step S603.

Figure 7:
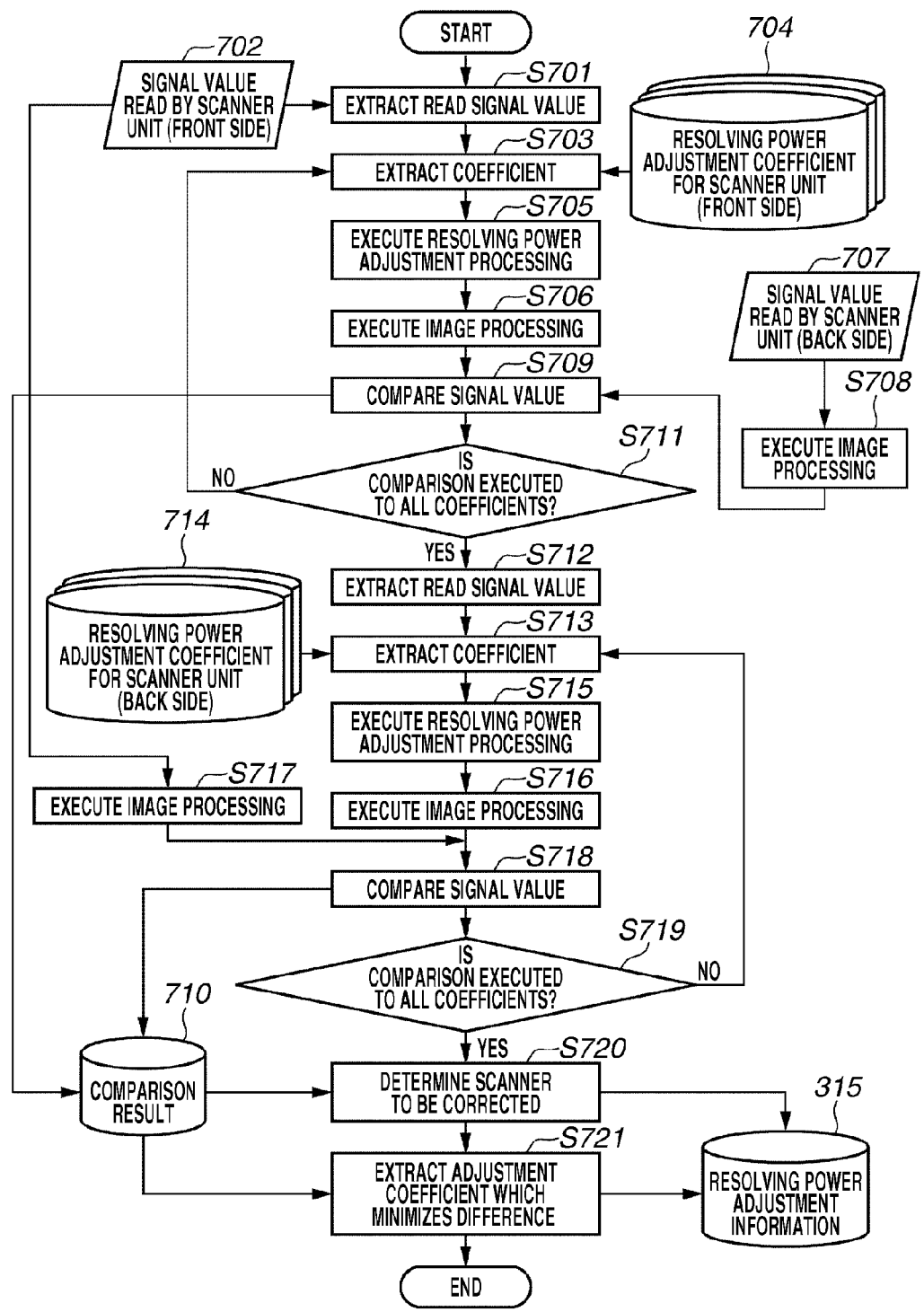
FIG. 7 is a flowchart illustrating a detail processing flow of resolving power adjustment information calculation according to the first exemplary embodiment.

FIG. 7 is a flowchart illustrating a flow of resolving power adjustment information calculation processing in step S608. Processing in FIG. 7 is executed by the resolving power adjustment information calculation processing unit 211.

First, in step S701, the resolving power adjustment information calculation processing unit 211 extracts a read signal value from a signal value read by the scanner unit (front side) 702. The signal value read by the scanner unit (front side) 702 is data scanned in step S601.

Next, in step S703, the resolving power adjustment information calculation processing unit 211 extracts a coefficient from a resolving power adjustment coefficient for the scanner unit (front side) 704. The resolving power adjustment coefficient for the scanner unit (front side) 704 is a coefficient of a filter for adjusting resolving power of the scanner and includes a plurality of coefficients for changing a gain by targeting a specific frequency. The coefficient may be prepared in advance. Any coefficient such as a coefficient for decreasing a gain and a coefficient for increasing a gain may be employed. In step S703, the resolving power adjustment information calculation processing unit 211 extracts one from the resolving power adjustment coefficient for the scanner unit (front side) 704.

Next, using the extracted coefficient, in step S705, the resolving power adjustment information calculation processing unit 211 executes resolving power adjustment processing. Filtering processing is executed to a signal value of each of R, G, and B using the extracted coefficient.

Then, in step S706, the resolving power adjustment information calculation processing unit 211 executes image processing. In the present exemplary embodiment, the image processing similar to that in step S602 is executed. However, any image processing may be employed.

In step S708, the resolving power adjustment information calculation processing unit 211 executes image processing to a signal value read by the scanner unit (back side) 707. In the present exemplary embodiment, the image processing similar to that in step S604 is executed. However, any image processing may be employed.

Next, in step S709, the resolving power adjustment information calculation processing unit 211 compares signal values of two pieces of the data on which image processing are executed and stores a compared result 710 in the storage unit 203. As the compared result in the present exemplary embodiment, an average value of the difference is used. However, any value may be employed.

Then, in step S711, it is determined whether the signal value is compared to all coefficients of the resolving power adjustment coefficient for the scanner unit (front side) 704. When it is not yet compared all (NO in step S711), the processing returns to step S703 and is repeated.

When the processing has been executed to all coefficients (YES in step S711), then in step S712, the resolving power adjustment information calculation processing unit 211 extracts a read signal from the signal value read by the scanner unit (back side) 707. Next, in step S713, the resolving power adjustment information calculation processing unit 211 extracts one coefficient from a resolving power adjustment coefficient for the scanner unit (back side) 714.

Then, in step S715, the resolving power adjustment information calculation processing unit 211 executes resolving power adjustment processing. In the present exemplary embodiment, the image processing similar to that in step S604 is executed. However, any image processing may be employed.

On the other hand, in step S717, the resolving power adjustment information calculation processing unit 211 executes image processing to the signal value read by the scanner unit (front side) 702. In the present exemplary embodiment, the image processing similar to that in step S602 is executed. However, any image processing may be employed.

Then, in step S718, the resolving power adjustment information calculation processing unit 211 compares the signal values and stores the compared result 710 in the storage unit 203. This processing is similar to that in step S709.

Then, in step S719, it is determined whether the signal value is compared to all coefficients of the resolving power adjustment coefficient for the scanner unit (back side) 714. When it is not yet compared all (NO in step S719), the processing returns to step S713 and is repeated.

When the processing has been executed to all coefficients (YES in step S719), then in step S720, the resolving power adjustment information calculation processing unit 211 determines a scanner to be corrected.

A state in which a difference between the compared results is the smallest provides a state most similar in the resolving power between the scanner unit (front side) 201 and the scanner unit (back side) 202. Further, when a coefficient is selected from the resolving power adjustment coefficient for the scanner unit (front side) 704 in the state in which a difference between the compared results is the smallest, the scanner unit (front side) 201 will be the scanner to be corrected. Similarly, when a coefficient is selected from the resolving power adjustment coefficient for the scanner unit (back side) 714 in the state in which a difference between the compared results is the smallest, the scanner unit (back side) 202 will be the scanner to be corrected.

Information about the determined scanner to be corrected is stored in the resolving power adjustment information 315. Then, in step S721, the resolving power adjustment information calculation processing unit 211 extracts an adjustment coefficient (correction condition) which minimizes the difference from among the compared results 710 and stores the extracted adjustment coefficient in the resolving power adjustment information 315.

Finally, processing for adjusting resolving power using the scanner to be corrected and the adjustment coefficient stored in the resolving power adjustment information 315 will be described in detail.

Figure 8:
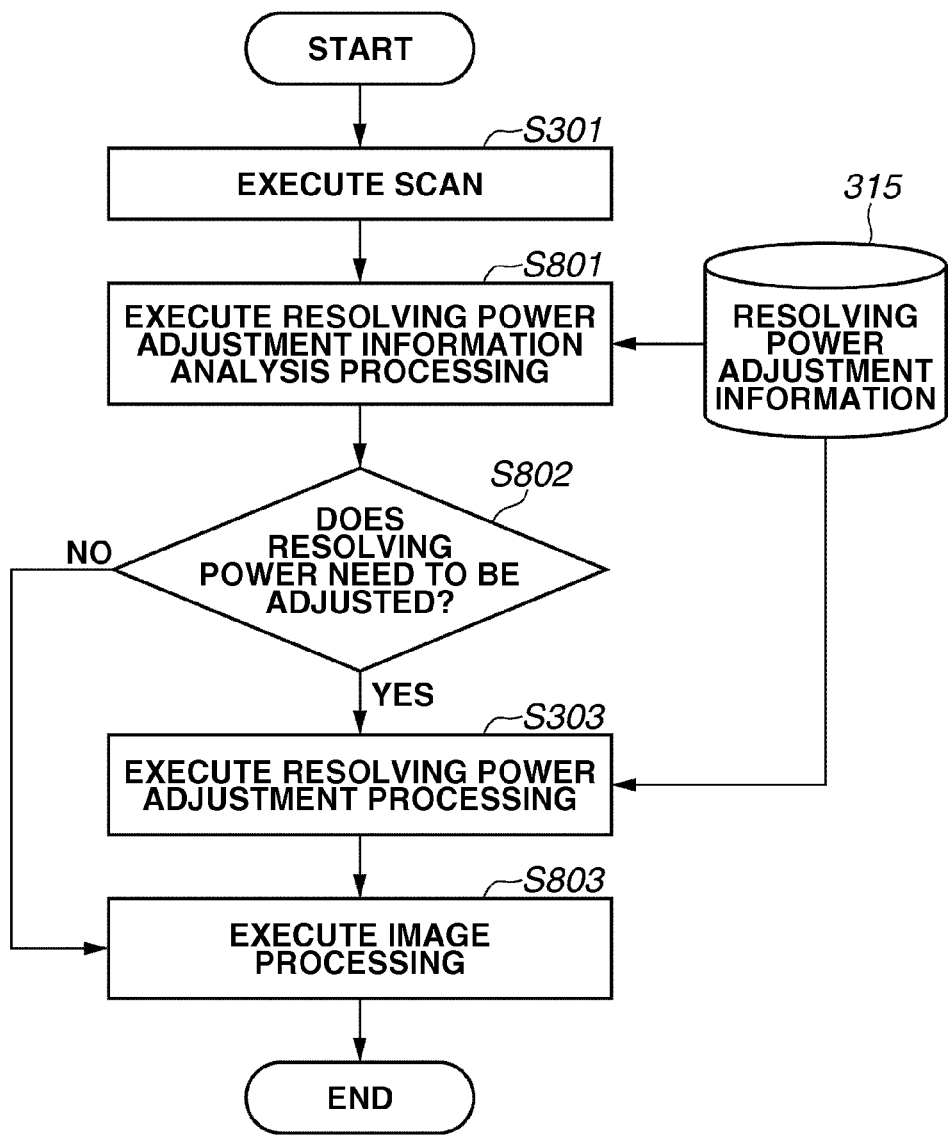
FIG. 8 is a flowchart illustrating a processing flow for adjusting resolving power according to the first exemplary embodiment.

FIG. 8 illustrates a flow of resolving power adjustment processing in step S303. All of the following processing is executed by the image processing unit 209.

After scan is executed in step S301, in step S801, the image processing unit 209 executes analysis processing using the resolving power adjustment information 315. The analysis processing is for analyzing whether the used scanner is the scanner to be corrected.

Using the analysis result, in step S802, the image processing unit 209 determines whether resolving power needs to be adjusted. When it is determined that resolving power does not need to be adjusted (NO in step S802), then in step S803, image processing is executed. The image processing in step S803 will be provided by processing from step S304 in FIG. 3.

When it is determined that resolving power needs to be adjusted (YES in step S802), then in step S303, the image processing unit 209 executes resolving power adjustment processing using a filter coefficient which is obtained from the resolving power adjustment information 315. Then, in step S803, the image processing unit 209 executes image processing.

In the present exemplary embodiment, a plurality of types of scanners connected to one MFP is a target of correction. However, the scanner may be independent. Further, a number of scanners is not limited to two but any number of scanners may be employed.

According to the present invention, by correcting reading resolving power of the plurality of scanners using a chart of highlights in which differences in resolving power thereof are reflected, a difference in resolving power of the plurality of scanners can be highly accurately corrected.

Next, an exemplary embodiment in which resolving power in a plane of a scanner is corrected will be described. In the first exemplary embodiment, in order to correct a difference in resolving power between the scanner unit (front side) 201 and the scanner unit (back side) 202, the resolving power adjustment information 315 is calculated. In a second exemplary embodiment, for example, when there is a difference in resolving power in a plane of the scanner unit (front side) 201, the resolving power adjustment information 315 is calculated for correcting inconsistencies of the in-plane resolving power. A difference in resolving power may occur in a main scan direction, a sub scan direction or all directions depending on characteristics of a scanner. However, in the present exemplary embodiment, processing for correcting a difference in a main scan direction will be described.

Figure 17:
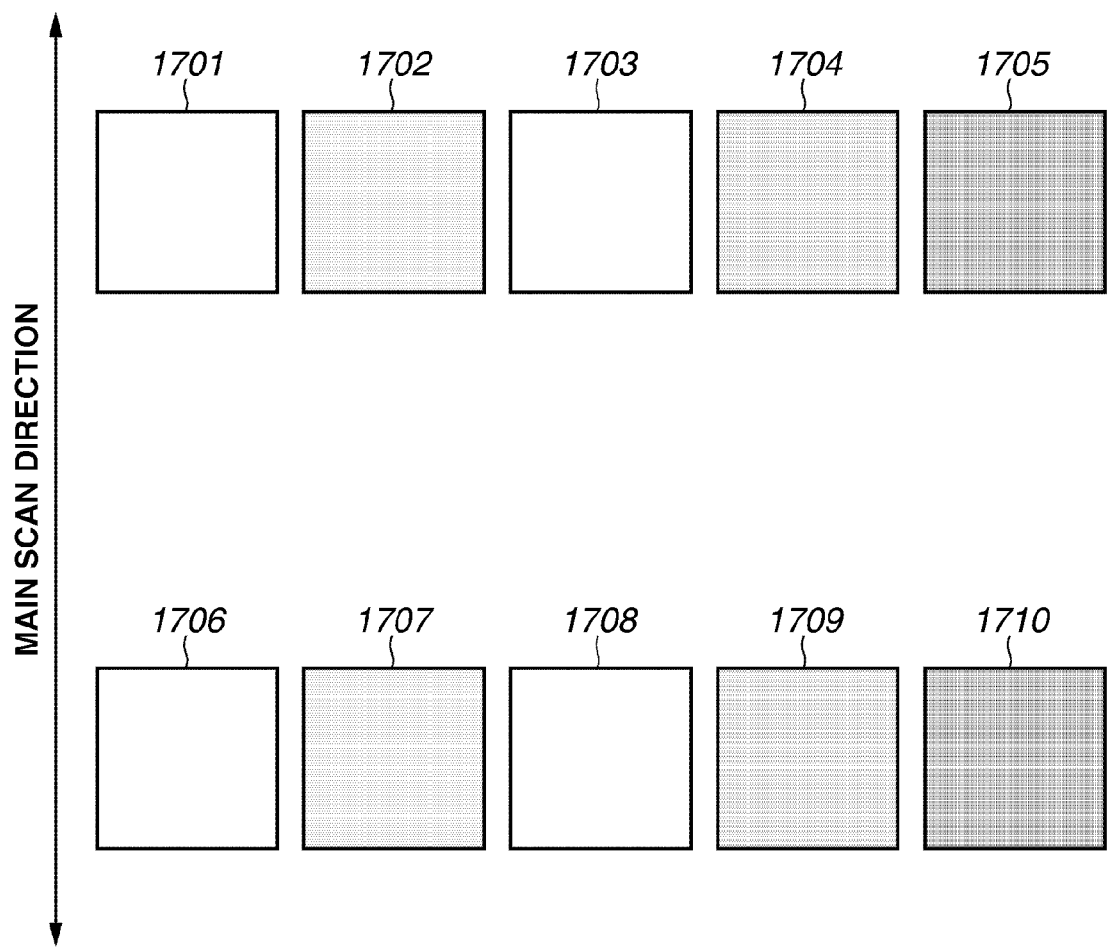
FIG. 17 illustrates image data for calculating resolving power adjustment information between in-plane specified positions according to the second exemplary embodiment.

Image data (resolving power adjustment information calculating chart) which is used for executing processing to the main scan direction is different from that in the first exemplary embodiment. FIG. 17 illustrates an example of a chart which is used in the present exemplary embodiment. Pieces of rectangular data 1701 to 1705 are similar to the rectangles 401 to 405 in FIG. 4. Thus, the descriptions thereof will be omitted. Pieces of rectangular data 1706 to 1710 are similar to the pieces of rectangular data 1701 to 1705 and are disposed in different locations in a main scan position.

In the present exemplary embodiment, a difference in the main scan direction is determined. However, when a difference in a sub scan direction is determined, similar data is disposed in the sub scan direction. The resolving power adjustment information calculating chart 505 is generated to data in FIG. 17 using the flowchart shown in FIG. 5 similarly to the first exemplary embodiment.

Figure 9:
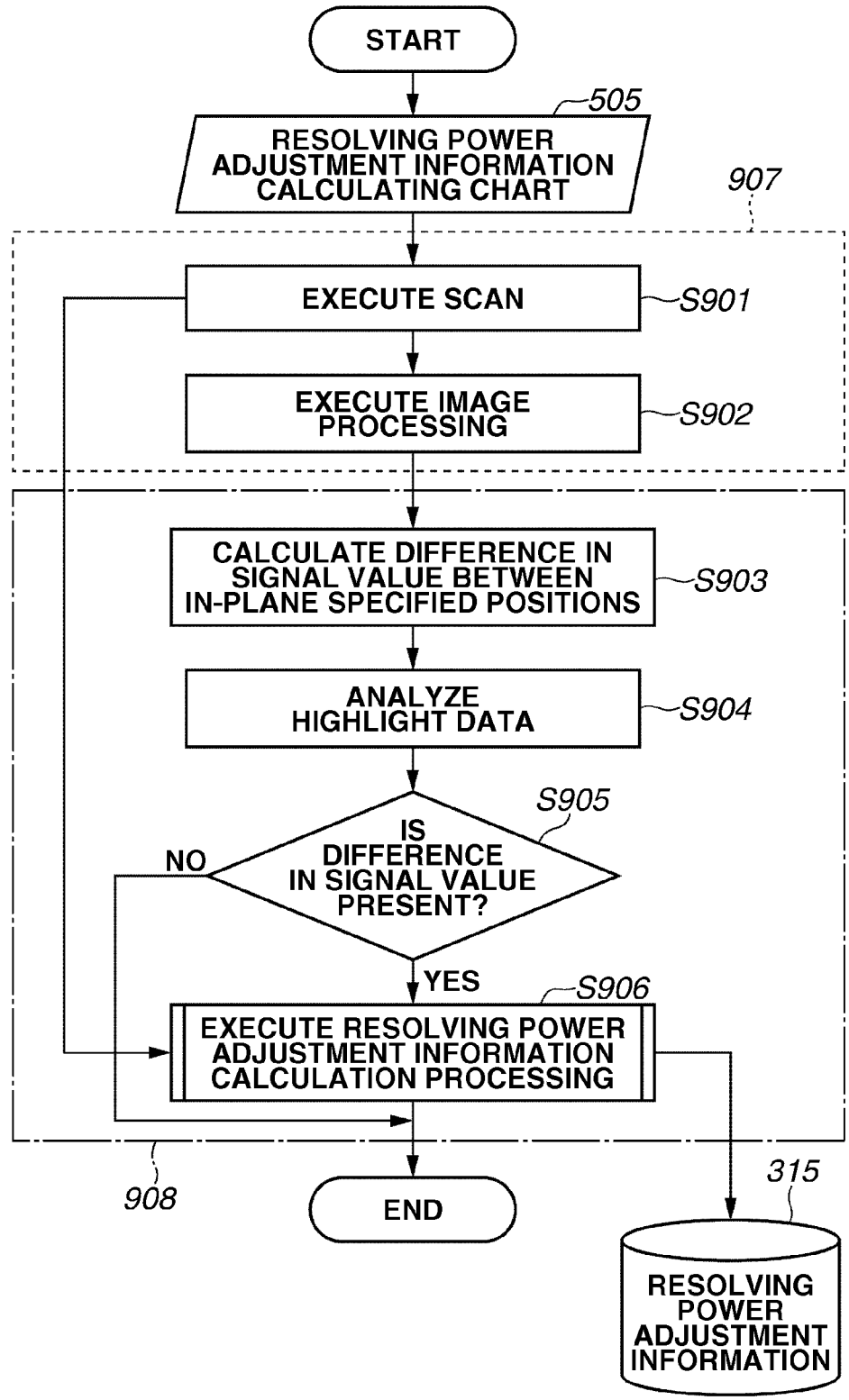
FIG. 9 is a flowchart illustrating a processing flow for calculating resolving power adjustment information between in-plane specified positions according to a second exemplary embodiment.

Next, a flow of processing in the present exemplary embodiment will be described using FIG. 9. The following processing is executed by the image processing unit 209 and the resolving power adjustment information calculation processing unit 211.

Processing 907 in steps S901 to S902 which will be described below is executed by the image processing unit 209. Further, processing 908 in steps S903 to S906 is executed by the resolving power adjustment information calculation processing unit 211.

A flowchart in FIG. 9 will be described. First, in step S901, the image processing unit 209 scans the resolving power adjustment information calculating chart 505 generated using the procedure in FIG. 5 by the scanner unit 201 or 202 using the data in FIG. 17.

Next, in step S902, the image processing unit 209 executes image processing. The image processing executed in step S902 may be all or a part of processing in steps S301 to S314 which is executed by the image processing unit 209. In the present exemplary embodiment, processing until step S308 for calculating the CMYK image 309 in a case of copy processing is executed.

Next, in step S903, the resolving power adjustment information calculation processing unit 211 calculates a difference in signal values between in-plane specified positions. In a case of data in FIG. 17, the in-plane specified positions are provided by two locations in the main scan direction.

In step S904, the resolving power adjustment information calculation processing unit 211 analyzes highlight data using the calculated difference in the signal values.

In step S905, when the difference in signal values is equal to or smaller than a predetermined specified value (NO in step S905), it is assumed that there is no difference in resolving power. Then, the processing ends. When the difference in the signal values is equal to or larger than a specified value (YES in step S905), in step S906, the resolving power adjustment information calculation processing unit 211 executes resolving power adjustment information calculation processing to calculate the resolving power adjustment information 315. In step S906, the scanned result in step S901 is used.

Figure 10:
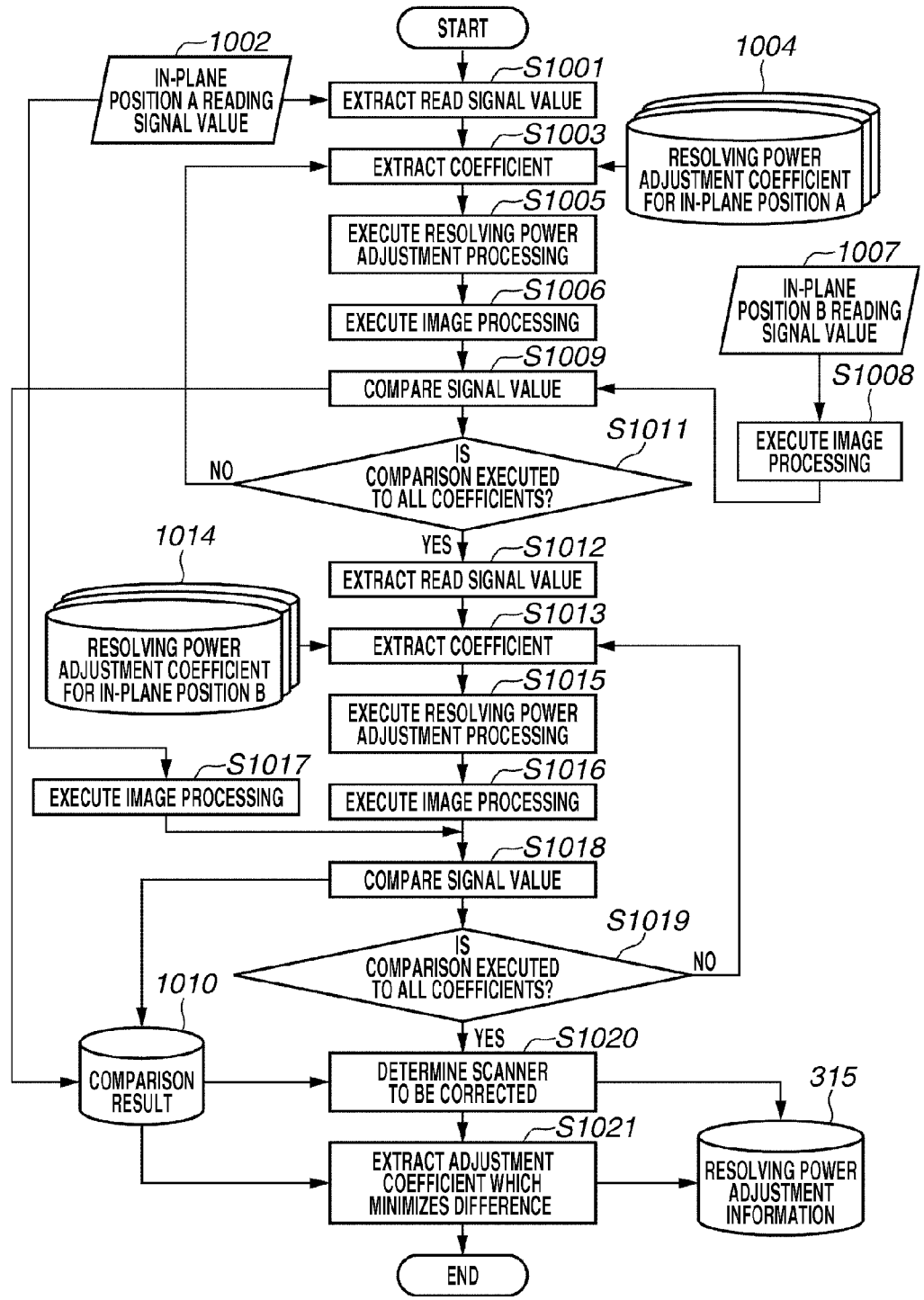
FIG. 10 is a flowchart illustrating a detail processing flow of resolving power adjustment information calculation between in-plane specified positions according to the second exemplary embodiment.

FIG. 10 illustrates a flow of resolving power adjustment information calculation processing in step S906. Processing in FIG. 10 is executed by the resolving power adjustment information calculation processing unit 211.

A flowchart in FIG. 10 is almost similar to the flowchart in FIG. 7. The flowchart in FIG. 10 differs from the flowchart in FIG. 7 in that the scanner unit (front side) in FIG. 7 is changed to an in-plane position A and the scanner unit (back side) is changed to an in-plane position B. The in-plane position A (position of pixel) indicates the pieces of rectangular data 1701 to 1705 in FIG. 17 and the in-plane position B indicates the pieces of rectangular data 1706 to 1710.

In FIG. 10, the signal value read by the scanner unit (front side) 702 is replaced with a signal value read in the in-plane position A 1002 and the resolving power adjustment coefficient for the scanner unit (front side) 704 is replaced with a resolving power adjustment coefficient for the in-plane position A 1004. Further, the signal value read by the scanner unit (back side) 707 is replaced with a signal value read in the in-plane position B 1007 and the resolving power adjustment coefficient for the scanner unit (back side) 714 is replaced with a resolving power adjustment coefficient for the in-plane position A 1014.

Processing in steps S1001 to 1021 is similar to that in steps S701 to S721. Thus, the descriptions thereof will be omitted.

In the present exemplary embodiment, two positions are provided as the in-plane positions, any number of in-plane positions may be employed. When three or more in-plane positions are provided, for example, three or more types of signal values are compared in step S1009.

Further, as another example, a plurality of signal values may be read in step S1001. In this case, the resolving power adjustment information calculation processing unit 211 reads a plurality of adjustment coefficients in step S1003, executes resolving power adjustment processing to the plurality of signal values in step S1005, and then, compares the signal values in step S1009.

The present exemplary embodiment has been described using the main scan direction as an example. However, processing may be executed to the sub scan direction or all directions. In this case, arrangement of image data in FIG. 17 will target at the sub scan direction or all directions.

Further, in the present exemplary embodiment, the resolving power adjustment information calculating chart 505 is assumed to be uniform in the plane. However, in fact, a density difference may occur during printing. The density difference may be stored in the storage unit 203 in advance and fed back when signal values are compared.

In the present exemplary embodiment, it is focused on only the in-plane position. However, processing concerning a difference in resolving power between the scanner unit (front side) 201 and the scanner unit (back side) 202 may be combined with that of the in-plane position.

According to the present invention, by correcting reading resolving power of a plurality of scanners using a chart of highlights in which differences in resolving power thereof are reflected, a difference in resolving power of positions in a plane of the scanner can be highly accurately corrected.

Next, an exemplary embodiment in which high-density data is used will be described. In the first and the second exemplary embodiments, the resolving power adjustment information 315 for correcting a difference in resolving power is calculated using highlight data. In a third exemplary embodiment, a method for processing in which a factor other than resolving power is separated from it using high-density data will be described.

FIG. 11 illustrates an example of a chart which is used in the present exemplary embodiment. Pieces of rectangular data 1101 to 1105 are highlight data similar to the rectangles 401 to 405 in FIG. 4. Thus, the description thereof will be omitted. Pieces of rectangular data 1106 to 1110 include rectangles of high-density cyan 1106, high-density magenta 1107, high-density yellow 1108, high-density black 1109, and mixed color gray 1110 which includes cyan, magenta, and yellow.

A reason for using high-density data will be described. Previously, an example in which appearance of a halftone dot document of highlight colors is changed by resolving power has been described using FIG. 16. However, when a document is provided by dark color data, even if printing is executed by halftone dots, a dot does not appear. Thus, in the case of a document of the high-density data, a difference in appearance may be caused not by a difference in resolving power but by a difference in color separation performance.

From the reason described above, the present exemplary embodiment separates a difference in appearance due caused by resolving power and a difference in appearance caused by color separation performance using high-density data and highly accurately corrects the difference in resolving power.

A flow of processing in the present exemplary embodiment will be described using FIG. 12. The following processing is executed by the image processing unit 209 and the resolving power adjustment information calculation processing unit 211.

Figure 12:
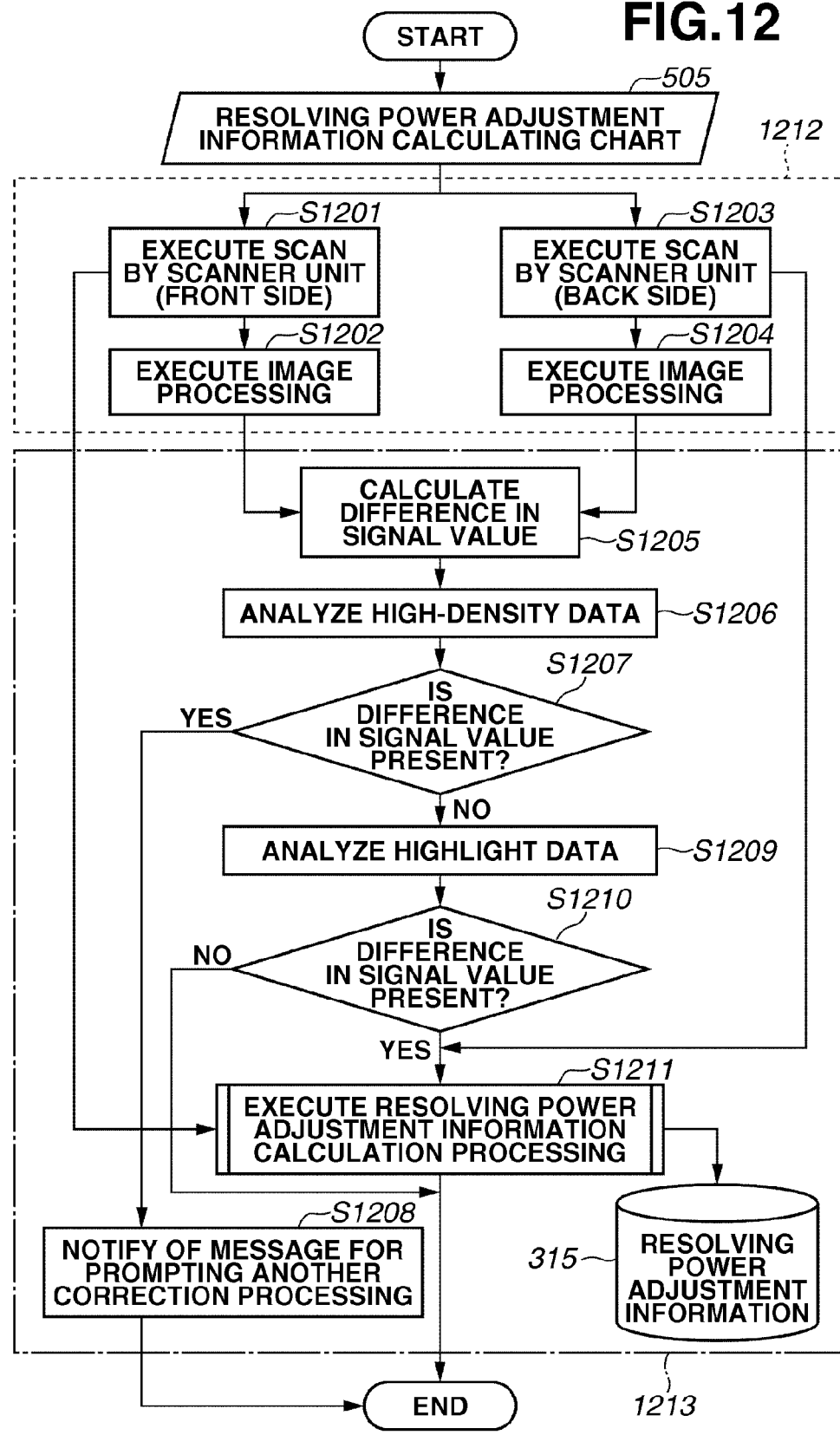
FIG. 12 is a flowchart illustrating a processing flow for calculating resolving power adjustment information using high-density data according to the third exemplary embodiment.

Processing 1212 in steps S1201 to S1204 shown in FIG. 12 is executed by the image processing unit 209. Further, processing 1213 in steps S1205 to S1211 is executed by the resolving power adjustment information calculation processing unit 211. The resolving power adjustment information calculating chart 505 is generated by the processing in FIG. 5 using the data in FIG. 11.

Processing in steps S1201 to S1204 is similar to that in steps S601 to S604 in FIG. 6. Thus, the description thereof will be omitted.

Next, in step S1205, the resolving power adjustment information calculation processing unit 211 calculates a difference between a signal value read by the scanner unit (front side) and a signal value read by the scanner unit (back side). A method for calculating the difference is similar to that in step S605. However, it is calculated for not only the pieces of highlight data 1101 to 1105 but also the pieces of high-density data 1106 to 1110.

Next, in step S1206, the resolving power adjustment information calculation processing unit 211 analyzes the high-density data.

In step S1207, when it is determined that the difference in the signal values of the high-density data is equal to or larger than a predetermined value (YES in step S1207), it is determined that a difference in appearance occurs by an influence of the color separation performance and the processing proceeds to step S1208. In step S1208, the resolving power adjustment information calculation processing unit 211 sends a message for prompting a user to execute another correction processing other than resolving power adjustment processing. Another correction processing includes correcting of the color separation performance.

In the present exemplary embodiment, execution of another correction processing is prompted. However, another correction processing may be executed in conjunction with the processing. For example, in step S1208, processing for correcting the color separation performance may be executed. Further, after processing for correcting the color separation performance is executed, highlight data analysis processing in step S1209 may be executed. Furthermore, resolving power adjustment processing itself may be terminated on the way without prompting execution of another correction processing.

In step S1207, when it is determined that the difference in the signal values of the high-density data is equal to or smaller than the predetermined value (NO in step S1207), the resolving power adjustment information calculation processing unit 211 executes processing in steps S1209 to S1211 concerning the highlight data. Processing in steps S1209 to S1211 is similar to that in steps S606 to S608. Thus, the descriptions thereof will be omitted.

Similarly to that in the first exemplary embodiment, in the present exemplary embodiment, processing for calculating resolving power adjustment information between the scanner unit (front side) 201 and the scanner unit (back side) 202 is described. However, as that in the second exemplary embodiment, processing may be executed for in-plane specified positions. Further, it may be combined with processing concerning the scanner unit (front side) 201 and the scanner unit (back side) 202, and processing for the in-plane specified positions.

According to the present exemplary embodiment, using a resolving power correction chart of the high-density data in addition to the resolving power correction chart of highlight colors, a difference in resolving power among a plurality of scanners can be highly accurately corrected by considering a difference in color separation performance.

Next, an exemplary embodiment in which calculated resolving power adjustment information is checked using high-density data will be described.

In the first and the second exemplary embodiments, the resolving power adjustment information 315 for correcting a difference in resolving power is calculated using highlight data. In the third exemplary embodiment, a factor other than resolving power is separated using the high-density data. In a fourth exemplary embodiment, a method for checking resolving power adjustment information using the high-density data will be described.

Similarly to that in the third exemplary embodiment, data used in the resolving power adjustment information calculating chart 505 includes highlight data and high density data as that in FIG. 11. Thus, the detailed description thereof will be omitted.

A flow of processing in the present exemplary embodiment will be described using FIG. 13. The following processing is executed by the image processing unit 209 and the resolving power adjustment information calculation processing unit 211.

Figure 13:
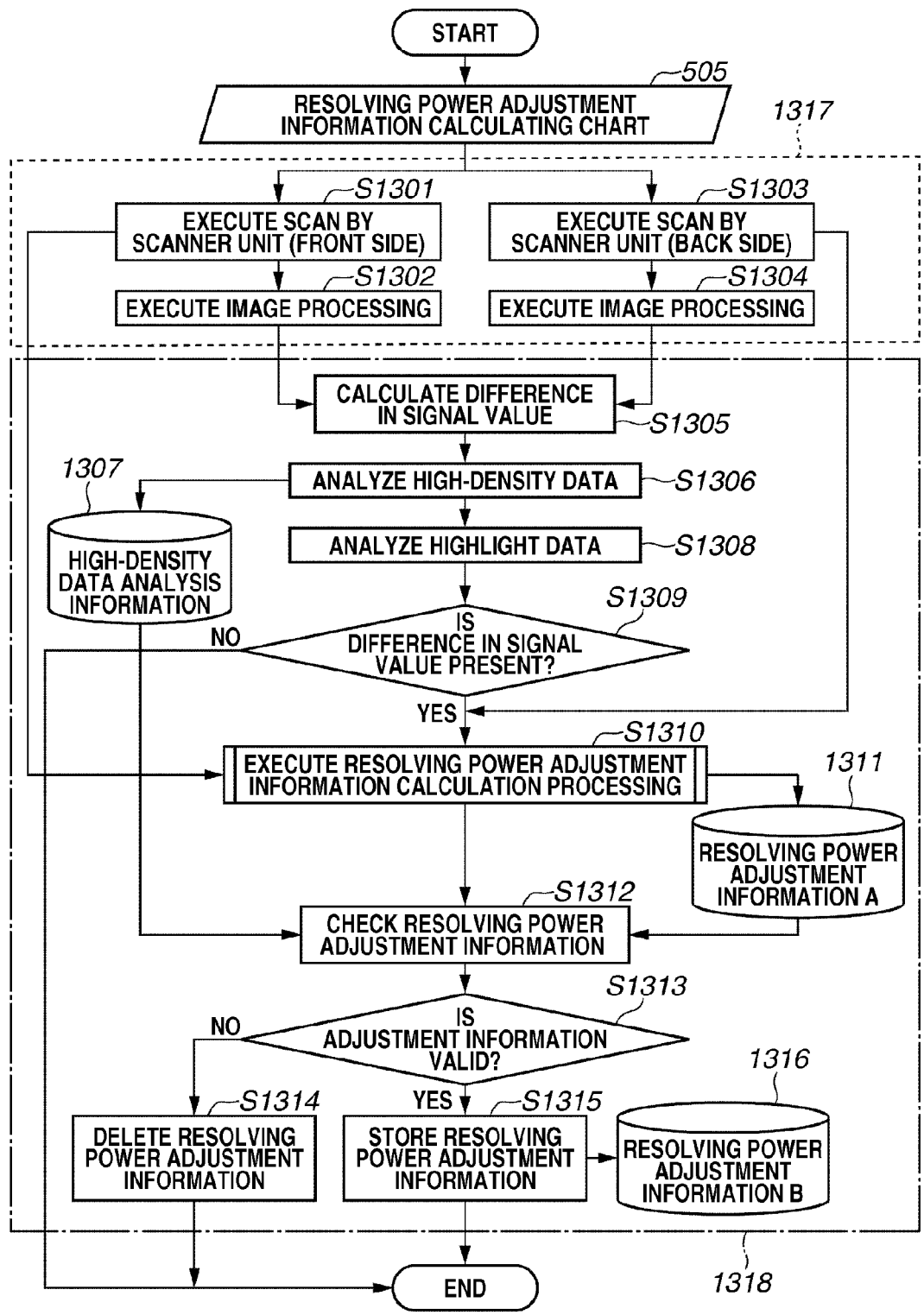
FIG. 13 is a flowchart illustrating a processing flow for checking validity of resolving power adjustment information calculated using high-density data according to a fourth exemplary embodiment.

Processing 1317 in steps S1301 to S1304 shown in FIG. 13 is executed by the image processing unit 209. Further, processing 1318 in steps S1305 to S1315 shown in FIG. 13 is executed by the resolving power adjustment information calculation processing unit 211. The resolving power adjustment information calculating chart 505 is generated by the processing in FIG. 5 using the data in FIG. 11.

Processing in steps S1301 to S1304 is similar to that in steps S601 to S604 shown in FIG. 6. Thus, the descriptions thereof will be omitted.

Next, in step S1305, the resolving power adjustment information calculation processing unit 211 calculates a difference in signal values. A method for calculating the difference is similar to that in step S1205. A difference between the highlight data read by the scanner unit (front side) 201 and the highlight data read by the scanner unit (back side) 202 is calculated. Further, a difference between the high-density data read by the scanner unit (front side) 201 and the high-density data read by the scanner unit (back side) 202 is calculated.

Next, in step S1306, the resolving power adjustment information calculation processing unit 211 analyzes the high-density data and stores an analysis result in the storage unit 203 as high-density data analysis information 1307. The high-density data analysis information 1307 may be any types of data. However, in the present exemplary embodiment, a difference in the high-density data calculated in step S1305 from each data 1106 to 1110 is stored as analysis information.

Next, in step S1308, the resolving power adjustment information calculation processing unit 211 analyzes the highlight data.

Then, in step S1309, when there is no difference in the signal values (NO in step S1309), resolving power does not need to be adjusted. Thus, resolving power adjustment processing ends.

When there is a difference in a signal value (YES in step S1309), in step S1310, resolving power adjustment information calculation processing is executed. The processing in step S1310 is similar to that in step S608. However, when an adjustment coefficient which minimizes the difference is extracted, not only the coefficient but also the difference in the signal values of the pieces of data 1101 to 1105 are stored as resolving power adjustment information A 1311.

Then, in step S1312, the resolving power adjustment information calculation processing unit 211 checks the resolving power adjustment information using the high-density data analysis information 1307. In the present exemplary embodiment, a difference in the above-described highlight data stored in the resolving power adjustment information A 1311 and a difference in the high-density data which is calculated in step S1305 and stored in the high-density data analysis information 1307 are compared.

More specifically, a difference between cyan data 1101 read by the scanner unit (front side) 201 and cyan data 1101 read by the scanner unit (back side) 202 is denoted as a difference A. Further, a difference between cyan data 1106 read by the scanner unit (front side) 201 and cyan data 1106 read by the scanner unit (back side) 202 is denoted as a difference B.

By comparing the difference A and the difference B, it is determined whether the adjustment coefficient of the resolving power adjustment information A 1311 is correct or not. When the difference A is similar to the difference B, it is determined that the adjustment coefficient is correct. When the difference A is not similar to the difference B, it is determined that the adjustment coefficient is not correct.

Similarly, in the present exemplary embodiment, a difference between magenta data 1102 read by the scanner unit (front side) 201 and magenta data 1102 read by the scanner unit (back side) 202, and a difference between magenta data 1107 read by the scanner unit (front side) 201 and magenta data 1107 read by the scanner unit (back side) 202 are compared. Further, a difference between yellow data 1103 read by the scanner unit (front side) 201 and yellow data 1103 read by the scanner unit (back side) 202, and a difference between yellow data 1108 read by the scanner unit (front side) 201 and yellow data 1108 read by the scanner unit (back side) 202 are compared.

Furthermore, a difference between black data 1104 read by the scanner unit (front side) 201 and black data 1104 read by the scanner unit (back side) 202, and a difference between black data 1109 read by the scanner unit (front side) 201 and black data 1109 read by the scanner unit (back side) 202 are compared. Still furthermore, a difference between mixed color gray data 1105 read by the scanner unit (front side) 201 and mixed color gray data 1105 read by the scanner unit (back side) 202, and a difference between mixed color gray data 1110 read by the scanner unit (front side) 201 and mixed color gray data 1110 read by the scanner unit (back side) 202 are compared.

In step S1313, the resolving power adjustment information calculation processing unit 211 determines whether the calculated resolving power adjustment information A 1311 is valid. Difference information about the highlight data in the resolving power adjustment information A 1311 includes both "difference by color separation performance" and "difference by resolving power" and stores data which minimizes "difference by resolving power". In contrast to this, the high-density data analysis information 1307 includes only "difference by color separation performance". Thus, difference information about the signal value included in the resolving power adjustment information A 1311 will be a similar value compared with the high-density data analysis information 1307.

If a difference in the highlight data read by the scanner unit (front side) 201 and the scanner unit (back side) 202 (resolving power adjustment information A 1311) is extremely smaller than a difference in the high-density data read by the scanner unit (front side) 201 or the scanner unit (back side) 202 (high-density data analysis information 1307), it is determined that adjustment information is not valid.

When it is determined that adjustment information is not valid (NO in step S1313), then in step S1314, the resolving power adjustment information calculation processing unit 211 deletes the resolving power adjustment information. Then, resolving power adjustment processing ends. When it is determined that adjustment information is valid (YES in step S1313), then in step S1315, the resolving power adjustment information calculation processing unit 211 stores the resolving power adjustment information B.

Similarly to that in the first exemplary embodiment, in the present exemplary embodiment, processing for calculating resolving power adjustment information between the scanner unit (front side) 201 and the scanner unit (back side) 202 is described. However, as that in the second exemplary embodiment, processing may be executed for in-plane specified positions. Further, it may be combined with processing concerning the scanner unit (front side) 201 and the scanner unit (back side) 202, and processing for the in-plane specified positions.

According to the present exemplary embodiment, using a resolving power correction chart of the high-density data in addition to the resolving power correction chart of highlight colors, validity of resolving power adjustment information on highlights can be determined. Thus, a negative effect of correcting resolving power of the scanner more than necessary can be prevented.

Next, an exemplary embodiment in which resolving power adjustment information is switched in response to a job to be targeted will be described. In the first to the fourth exemplary embodiments, resolving power adjustment information has been calculated regardless of a job to be targeted. In a fifth exemplary embodiment, further, a method for switching processing for calculating resolving power adjustment information corresponding to a type of jobs such as copy or transmission processing will be described.

A difference in appearance due to difference in resolving power is changed according to performed image processing. Particularly, in the case of a MFP which can execute copy and transmission processing, processing after step S307 is different in copy processing and in transmission processing.

In the case of copy processing, the common RGB image 305 is converted into the CMYK image 309 by color conversion processing in step S308. In the case of transmission processing, the common RGB image 305 is converted into the transmitting RGB image 313 by color conversion processing in step S312. Particularly, in the case of copy processing, the RGB data is converted into the CMYK data. Thus, nonlinear conversion processing is frequently executed by a reason for conversion into a color space which is different in a number of channels or the like.

For this reason, a difference in resolving power is emphasized and appearance of an image by the copy processing and that by the transmission processing may differ from each other. In the present exemplary embodiment, processing considering a difference in appearances corresponding to the types of the job will be described.

Figure 14:
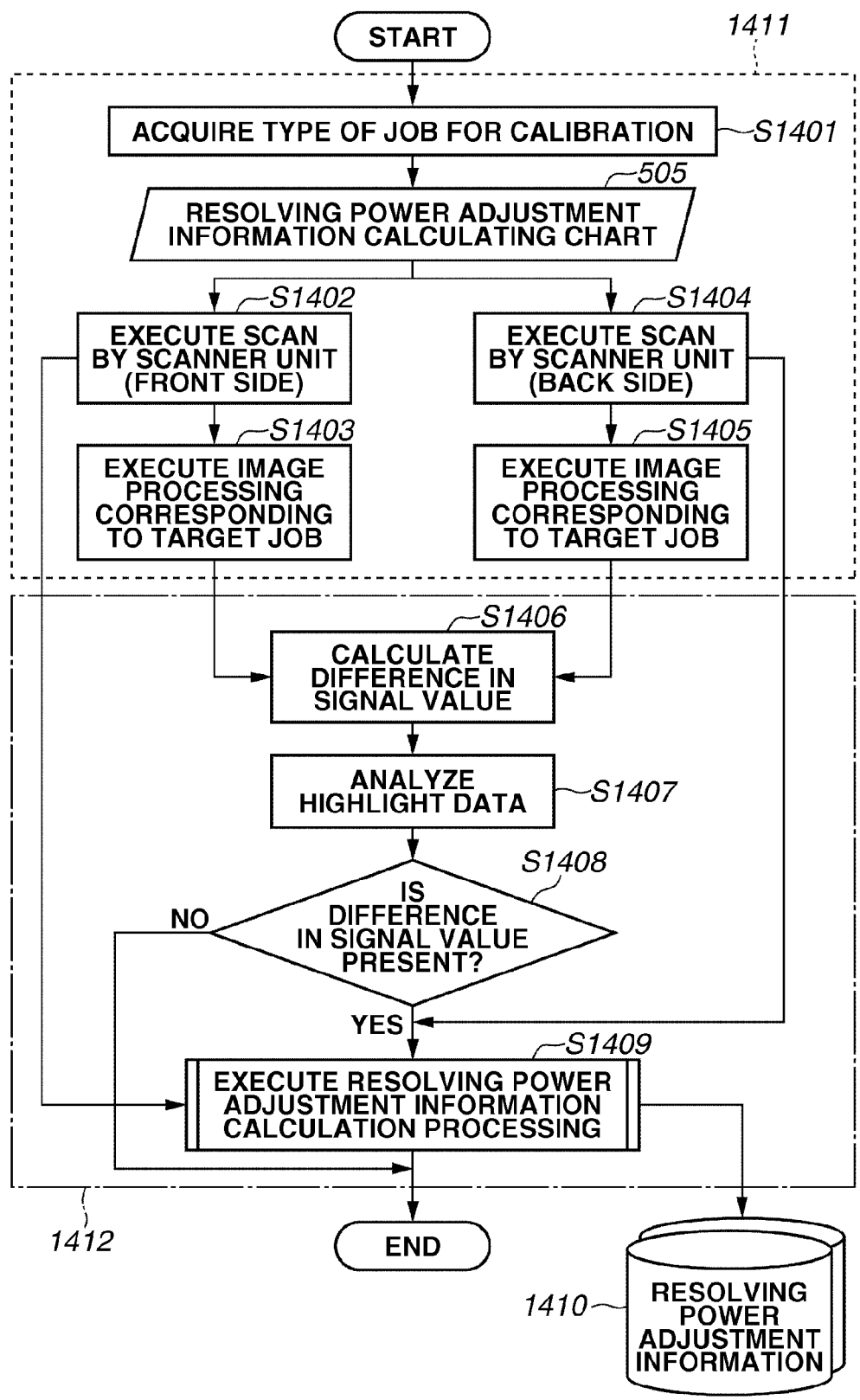
FIG. 14 is a flowchart illustrating a processing flow for calculating resolving power adjustment information corresponding to a job to be targeted according to a fifth exemplary embodiment.

A flow of processing in the present exemplary embodiment will be described using FIG. 14. The following processing is executed by the image processing unit 209 and the resolving power adjustment information calculation processing unit 211.

Processing 1411 in steps S1401 to S1405 which will be described below is executed by the image processing unit 209. First, in step S1401, the image processing unit 209 acquires the type of job to be calibrated. Information about the type of job to be calibrated is received from a user using, for example, the input apparatus 207. Then, the data processing apparatus 206 notifies the resolving power adjustment information calculation processing unit 211 of the type of job to be calibrated.

Next, in step S1402, the image processing unit 209 scans the resolving power adjustment information calculating chart 505 by the scanner unit (front side), and then in step S1403, executes image processing corresponding to a target job. For example, when the target job is copy, the image processing unit 209 executes image processing of copy. In an example shown in FIG. 3, processing until step S308 for outputting the CMYK image 309 is executed.

On the other hand, in step S1404, the image processing unit 209 scans the resolving power adjustment information calculating chart 505 by the scanner unit (back side). Then, in step S1405, similarly to that in step S1403, the image processing unit 209 executes image processing corresponding to the target job.

Processing 1412 in steps S1406 to S1409 which will be described below is executed by the resolving power adjustment information calculation processing unit 211 to calculate resolving power adjustment information 1410. A flow of processing in these steps S1406 to S1409 is similar to that in steps S605 to S608. Thus, the detailed descriptions thereof will be omitted.

In the present exemplary embodiment, processing is executed to one job. However, processing may be executed to a plurality of jobs. In that case, a plurality of types of the resolving power adjustment information 1410 is generated.

Figure 15:
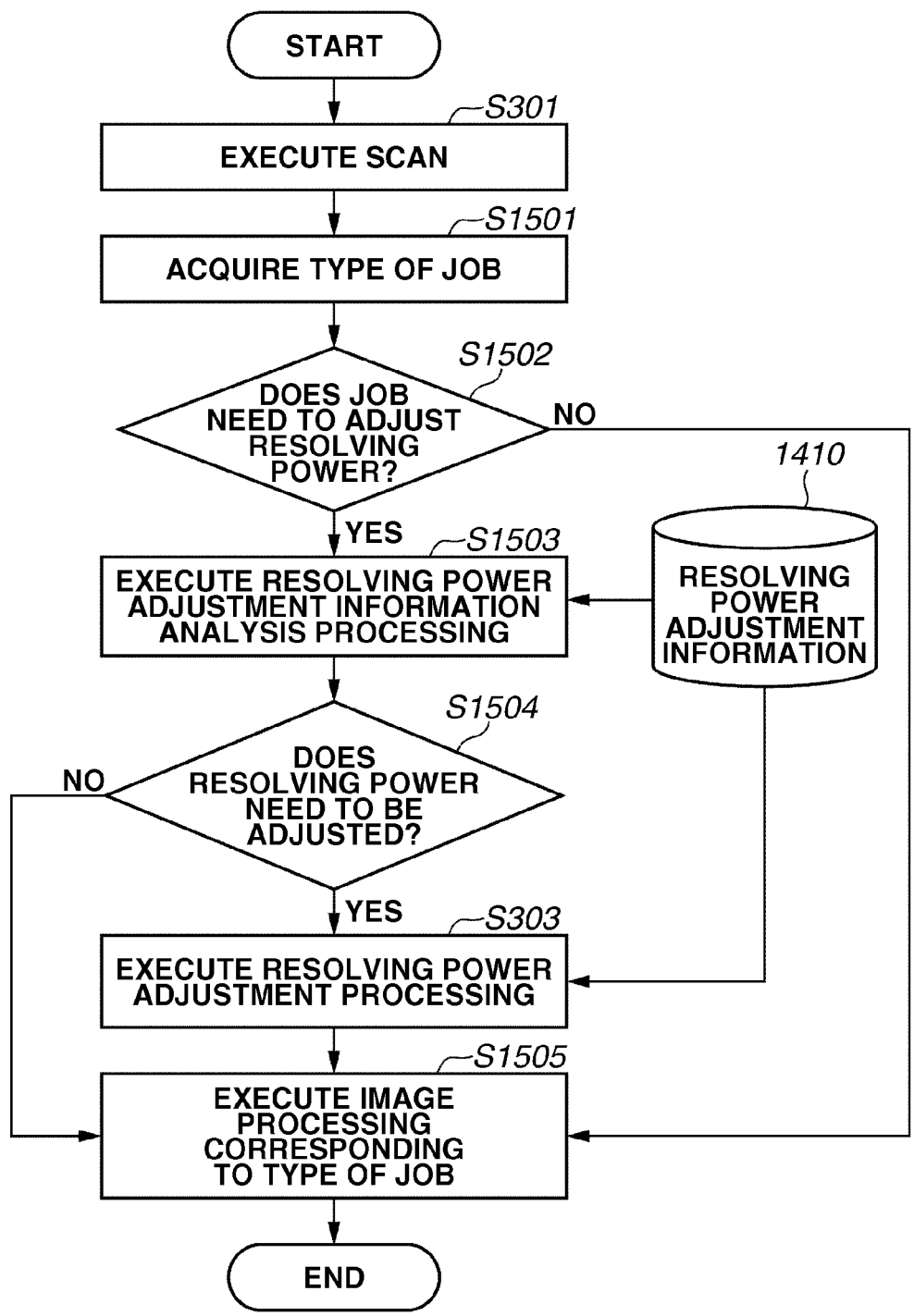
FIG. 15 is a flowchart illustrating a processing flow for adjusting resolving power corresponding to a job to be targeted according to a fifth exemplary embodiment.

Finally, processing for adjusting resolving power using the resolving power adjustment information 1410 will be described in detail. FIG. 15 illustrates a flow of resolving power adjustment processing in step S303. All of the following processing is executed by the image processing unit 209.

First, after scan is executed in step S301, in step S1501, the image processing unit 209 acquires a type of the job of the read image.

Then, in step S1502, when it is not a job necessary to adjust resolving power (NO in step S1502), in step S1505, the image processing unit 209 executes image processing corresponding to the type of the job. Then, the processing ends. The type of job is copy processing or transmission processing.

As described above, difference in resolving power may appear differently according to the contents of processing. Thus, there may be a case where a difference is large in copy processing which executes color conversion by nonlinear processing while a difference is small in transmission processing. In such the case, transmission processing is set as a job which does not need to adjust resolving power and processing can be simplified by executing determination in step S1502.

Further, image processing corresponding to the type of job in step S1505 is image processing which is used in copy processing or transmission processing. For example, in an example shown in FIG. 3, steps S301 to S311 correspond to copy processing, steps S301 to S307 correspond to transmission processing, and steps S312 to S314 correspond to the image processing corresponding to the type of job.

In the present exemplary embodiment, copy and transmission processing are exemplified as the types of the job. However, if it is processing different in the type, an order, and a number of image processing to be executed, any processing may be employed.

When it is a job necessary to adjust resolving power (YES in step S1502), in step S1503, the image processing unit 209 executes analysis processing using the resolving power adjustment information 1410. The analysis processing is for analyzing whether the used scanner is the scanner to be corrected. Further, when there is a plurality of the resolving power adjustment information 1410, the image processing unit 209 acquires information about the target job.

As a result of analyzing information, in step S1504, the image processing unit 209 determines whether resolving power needs to be adjusted. When the resolving power does not need to be adjusted (NO in step S1504), the in step S1505, the image processing unit 209 executes image processing corresponding to the type of the target job. Whereas when the resolving power needs to be adjusted (YES in step S1504), the processing proceeds to step S303. In step S303, resolving power adjustment processing is executed using a filter coefficient which is obtained from the resolving power adjustment information 1410 and then in step S1505, image processing is executed.

In the present exemplary embodiment, a flow of processing similar to that in the first exemplary embodiment has been described. However, the present exemplary embodiment can be applied to the flow of processing in the second to the fourth exemplary embodiments.

The present exemplary embodiment can highly accurately correct a difference in appearance caused by different resolving power without depending on the accuracy of a chart. Further, the present exemplary embodiment can correct a difference in resolving power in consideration of an influence of image processing which is different according to the type of the job.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-307588, filed Dec. 2, 2008, which is hereby incorporated by reference herein in its entirety.

What is claimed is:

1. An image processing apparatus which inputs data obtained by reading a chart of highlights formed by an image forming apparatus and generates a correction condition of an image reading unit based on the data, the image processing apparatus comprising:
   a first image reading unit configured to read the chart of highlights formed by the image forming apparatus;
   a second image reading unit configured to read the chart of highlights;
   a calculation unit configured to calculate a difference between an image signal read by the first image reading unit and an image signal read by the second image reading unit; and
   a generation unit configured to generate a correction condition for correcting reading resolving power of the first image reading unit or reading resolving power of the second image reading unit corresponding to the difference.

2. The image processing apparatus according to claim 1, further comprising:
   a correction unit configured to correct resolving power of an image read by the first image reading unit or the second image reading unit using the correction condition generated by the generation unit.

3. The image processing apparatus according to claim 2, wherein in the correction unit, the processing for correcting resolving power of the image is smoothing processing or edge enhancement processing.

4. The image processing apparatus according to claim 2, further comprising:
   a determination unit configured to determine whether an image read by the first image reading unit or the second image reading unit is a job which needs resolving power adjustment,
   wherein when the determination unit determines that the image is the job which needs the resolving power adjustment, the correction unit corrects the resolving power of the image and when the determination unit determines that the image is not the job which needs the resolving power adjustment, the correction unit does not correct the resolving power of the image.

5. The image processing apparatus according to claim 1, wherein the generation unit generates a correction condition for minimizing the difference.

6. The image processing apparatus according to claim 1, wherein the calculation unit calculates a difference between an average signal value of the chart of highlights read by the first image reading unit and an average signal value of the chart of highlights read by the second image reading unit.

7. The image processing apparatus according to claim 1, wherein the first image reading unit is a scanner for reading a front side of a document and the second image reading unit is a scanner for reading a back side of a document.

8. The image processing apparatus according to claim 1, wherein the chart of highlights includes a plurality of charts having the same density, and resolving power of the image is corrected according to a position of a pixel of an image read by the first image reading unit or the second image reading unit using the chart.

9. The image processing apparatus according to claim 1,
   wherein the first image reading unit and the second image reading unit read a high-density chart,
   the calculation unit calculates a difference between an image signal of the high-density chart read by the first image reading unit and an image signal of the high-density chart read by the second image reading unit, and
   the generation unit generates a correction condition for correcting the reading resolving power of the first image reading unit or the reading resolving power of the second image reading unit according to the difference between the image signals read from the high-density chart and the difference between the image signals read from the chart of highlights.

10. The image processing apparatus according to claim 9, wherein when the difference between the image signals of the high-density chart is equal to or larger than a predetermined value, a message prompting a user to execute correction processing other than correction of the resolving power is displayed or correction of the resolving power is terminated.

11. The image processing apparatus according to claim 9, wherein the generation unit executes processing for determining whether the correction condition is correct using the difference between the image signals read from the high-density chart.

12. A method for image processing by an image processing apparatus which inputs data obtained by reading a chart of highlights formed by an image forming apparatus and generates a correction condition for a first image reading unit or a second image reading unit based on the data, the method comprising:

reading the chart of highlights formed in the image forming apparatus by the first image reading unit;

reading the chart of highlights by the second image reading unit;

calculating a difference between an image signal read by the first image reading unit and an image signal read by the second image reading unit; and generating a correction condition for correcting reading resolving power of the first image reading unit or reading resolving power of the second image reading unit corresponding to the difference.

13. A non-transitory computer-readable storage medium storing a program which causes a computer to execute a method for image processing by an image processing apparatus which inputs data obtained by reading a chart of highlights formed by an image forming apparatus and generates a correction condition for a first image reading unit or a second image reading unit based on the data, the method comprising:

reading the chart of highlights formed in the image forming apparatus by the first image reading unit;

reading the chart of highlights by the second image reading unit;

calculating a difference between an image signal read by the first image reading unit and an image signal read by the second image reading unit; and generating a correction condition for correcting reading resolving power of the first image reading unit or reading resolving power of the second image reading unit corresponding to the difference.

* * * * *